US010500725B2

(12) United States Patent
Ehrenleitner (10) Patent No.: US 10,500,725 B2
(45) Date of Patent: Dec. 10, 2019

(54) DEVICE AND METHOD FOR COMPENSATING WEIGHT

(71) Applicant: Huber Diffraktionstechnik GmbH & Co. KG, Rimsting (DE)

(72) Inventor: Franz Ehrenleitner, Altensteig-Walddorf (DE)

(73) Assignee: Huber Diffraktionstechnik GmbH & Co. KG, Rimsting (DE)

( * ) Notice: Subject to any disclaimer, the term of this patent is extended or adjusted under 35 U.S.C. 154(b) by 91 days.

(21) Appl. No.: 15/315,962

(22) PCT Filed: May 27, 2015

(86) PCT No.: PCT/EP2015/061638
§ 371 (c)(1),
(2) Date: Dec. 2, 2016

(87) PCT Pub. No.: WO2015/185397
PCT Pub. Date: Dec. 10, 2015

(65) Prior Publication Data
US 2017/0113347 A1    Apr. 27, 2017

(30) Foreign Application Priority Data

Jun. 2, 2014 (DE) .................. 10 2014 210 348

(51) Int. Cl.
 B25J 9/16 (2006.01)
 B25J 18/00 (2006.01)
 B25J 19/00 (2006.01)
(52) U.S. Cl.
 CPC ........... *B25J 9/1638* (2013.01); *B25J 18/002* (2013.01); *B25J 19/0008* (2013.01)

(58) Field of Classification Search
 CPC ......... B25J 19/0008–002; B25J 9/1638; Y10S 901/48
 See application file for complete search history.

(56) References Cited

U.S. PATENT DOCUMENTS 4,606,696 A   8/1986   Slocum
4,726,732 A   2/1988   Kato
(Continued)

FOREIGN PATENT DOCUMENTS

DE   10 2009 035 877 A1   2/2011
EP        2 705 934 A2    3/2014
(Continued)

OTHER PUBLICATIONS

International Search Report issued in connection with PCT/EP2015/061638.

*Primary Examiner* — Adam R Mott
(74) *Attorney, Agent, or Firm* — Akerman LLP (57) ABSTRACT

The invention relates to a method and a device (1) for compensating the weight (G) acting on a manipulator (2), wherein a variable counterforce (F) is generated, wherein the counterforce (F) generated is applied to the manipulator (2) by means of a supporting kinematic system (12) that contacts the manipulator in a force application region (22), and wherein a value of the counterforce (F) corresponds at least substantially to a value of the weight (G) acting on the force application region on account of acceleration due to gravity, and the counterforce (F) is directed at least substantially parallel and in the opposite direction to the acceleration due to gravity. The invention also relates to a system comprising a device (1) and a manipulator (2).

12 Claims, 5 Drawing Sheets

(56) References Cited

U.S. PATENT DOCUMENTS

2008/0237413 A1 10/2008 Hammer
2013/0013109 A1* 1/2013 Brudniok ............. B25J 19/0008
700/254

FOREIGN PATENT DOCUMENTS

| JP | 60-25673 A | 2/1985 |
| JP | 9-131689 A | 5/1997 |
| JP | 2000-271887 A | 10/2000 |

\* cited by examiner

DEVICE AND METHOD FOR COMPENSATING WEIGHT

This application is a national phase of PCT/EP2015/061638, filed May 27, 2015, and claims priority to DE 10 2014 210 348.7, filed Jun. 2, 2014, the entire contents of which are hereby incorporated by reference.

FIELD OF APPLICATION AND PRIOR ART

The application relates to a method and a device for compensating the weight acting on a manipulator.

In the context of the application, a manipulator is understood to be a device or machine which has a succession of largely rigid components which are connected by joints. Manipulators serve to grip or pick up, position and/or move loads such as tools or workpieces, measuring instruments or other articles and/or humans or animals. The components are referred to as arms or links. A manipulator usually has several degrees of freedom. The joints can have both rotational and translational degrees of freedom. The entirety of the links and joints is referred to as the kinematic system of the manipulator in the context of the application.

By way of example, the use of manipulators as goniometers is known. Here, sensors and samples are positioned in space by different manipulators and are measured at different solid angles. For exact measurement, it is necessary, in the event of a desired change in angle of the sample, that the measuring center be retained as exactly as possible. In order to achieve the necessary precision, first of all minimum eccentricity of the axes of rotation is necessary.

The weight influences the behavior of the manipulator, wherein the influence of the weight is dependent, inter alia, also on the orientation of the manipulator. In order to minimize any influence of the weight of the manipulator and possibly of a picked-up load on positioning, it is known to design the kinematic system of the manipulator in a manner as rigid as possible in order that there is as little displacement of the links on account of the weight as possible.

Alternatively or in addition, it is known from DE 10 2009 035 877 A1 to provide a compensating actuator system for carrying out translational compensating movements in a first and in a second spatial direction, and preferably also in a third spatial direction. The compensating actuator system comprises a motion control unit that is movable in translation in a first and second, and preferably also in the third spatial direction, at least one actuator, a first flexure bearing assembly having a first flexure bearing arrangement that is coupled mechanically to the motion control unit and forms a first simple lever, wherein, by means of the at least one actuator, the first flexure bearing arrangement is deflectable and thus, on account of this first coupling, the motion control unit is displaceable in translation in the first spatial direction, and a second flexure bearing assembly having a second flexure bearing arrangement that is coupled mechanically to the motion control unit and/or the first flexure bearing assembly and forms a toggle lever, wherein, by means of the at least one actuator, the second flexure bearing arrangement is displaceable and thus, on account of this second coupling, the motion control unit is displaceable in translation in the second spatial direction. High positioning accuracy is intended to be achieved by the compensating actuator system.

It is furthermore known, in order to compensate the weight acting on the links of the manipulator, to apply a moment which counteracts loading of the links on account of the weight. For example, WO 2007/054327 discloses a holding device for a medical optical instrument, having a support arm for absorbing a load, wherein the support arm is mounted at a first pivot joint so as to be pivotable relative to a holding unit. The holding device comprises means, in particular spring elements, for generating a longitudinal force which acts on the support arm in order to compensate a load torque that occurs in the first pivot joint of the support arm, wherein the means for generating a longitudinal force is mounted in a pivotable manner on the holding unit and exerts a force on a cam carrier which is operatively connected to the carrier arm. As a result of the pivotable mounting, the weight of the means for generating the longitudinal force is intended not to load the carrier arm and thus the means for generating the longitudinal force in order to compensate a load torque in the pivot joints of the carrier arm does not also have to compensate its dead weight.

Problem and Solution

The object of the invention is to provide a method and a device for compensating the weight acting on a manipulator, wherein compensation is reliably possible regardless of a position of the manipulator.

The object is solved by a method having the features of claim 1, a device having the features of claim 2, and system having the features of claim 11. Further advantages can be gathered from the dependent claims.

According to a first aspect, a method for compensating the weight acting on a manipulator is created, wherein a variable counterforce is generated and the counterforce generated is applied to the manipulator by means of a supporting kinematic system that contacts the manipulator in a force application region. The variable counterforce is selected in this case in that a value of the counterforce corresponds at least substantially to a value of the force acting on the force application region on account of acceleration due to gravity, and the counterforce is directed at least substantially parallel and in the opposite direction to the acceleration due to gravity.

According to a second aspect, a device for compensating the weight acting on a manipulator is created, comprising a force generating arrangement by means of which a variable counterforce can be generated, and a supporting kinematic system, wherein the counterforce generated can be applied to the manipulator by means of the supporting kinematic system in at least one force application region, and wherein a value of the counterforce corresponds at least substantially to a value of the force acting on the force application region on account of acceleration due to gravity, and the counterforce is directed at least substantially parallel and in the opposite direction to the acceleration due to gravity.

As a result of a counterforce being applied by means of a supporting kinematic system, it is possible to counteract deformation of the manipulator on account of the acceleration due to gravity. As a result, the manipulator is supported, wherein, at the same time, kinematic overdetermination, which would result from support by means of a support arranged in a fixed position, is avoided. The transmission kinematics can in this case be designed in a suitable manner depending on the available installation space or other requirements. The required force preferably can be generated by means of a spring arrangement. Alternatively, force generation by means of other devices allowing constant force generation, such as magnets, pneumatic devices, motor torque regulators or the like, is conceivable. The counterforce preferably takes into consideration all relevant masses of the manipulator and a possibly picked-up load. The supporting kinematic system can in this case have low inherent rigidity, as long as it is ensured that the force is transmitted to the force application region.

In advantageous configurations, the supporting kinematic system has at least one support portion by means of which the supporting kinematic system contacts the manipulator in the at least one force application region. The at least one support portion contacts the manipulator at a point suitable therefor. In advantageous configurations, provision is made for the support portion to contact the manipulator in an active region, i.e. at a free end or at a picked-up load. As a result, any effect of positioning inaccuracy on account of the weight in the relevant region is particularly advantageously reducible. However, it is also conceivable to support a manipulator having several links at one of the links by means of the counterforce.

In advantageous configurations, all three translational degrees of freedom are bound at the support portion.

In one development, provision is made for the supporting kinematic system to comprise a base and at least two links, wherein the force generating arrangement is arranged on the base and the supporting kinematic system transmits the counterforce to the at least one support portion. The links are coupled together and to the base via joints, in particular pivot joints.

As mentioned, in advantageous configurations, all three translational degrees of freedom are bound at the support portion. To this end, in one configuration, provision is made for the links of the supporting kinematic system to be arranged so as to be pivotable about a common, virtual pivot point, wherein the support portion is located at the virtual pivot point. Therefore, weight forces applied to the supporting kinematic system do not result in displacement of the supporting kinematic system but are compensated by the counterforce applied.

Alternatively, provision is made for at least one joint of the supporting kinematic system to be assigned an additional drive. By means of the at least one additional drive, the supporting kinematic system is held in a desired position, wherein the counterforce for compensating the weight is applied by means of the force generating arrangement.

In advantageous configurations, all three rotational degrees of freedom are bound at the base. Therefore, by means of the force generating arrangement, no rotary movements are introduced into the supporting kinematic system.

In advantageous configurations, provision is made for the supporting kinematic system to be configured in a manner corresponding to a kinematic system of the manipulator and to be arranged in or on the kinematic system of the manipulator. This ensures that the supporting kinematic system does not impede the movement of the manipulator and/or does not obstruct a working space of the manipulator.

In order for the supporting kinematic system to move with the manipulator, in one configuration, the supporting kinematic system comprises entraining elements for coupling to the manipulator. The supporting kinematic system preferably has a low dead weight and low-friction joints, such that no or only small additional forces are necessary to move the supporting kinematic system.

Finally, the problem is also solved by a system comprising a manipulator and a device according to the invention.

In one configuration, the manipulator comprises two links which are pivotable about two axes that are arranged at an angle of about 0° to about 90° to one another, in particular two axes that are arranged at an angle of about 5° to about 90° to one another and intersect one another at a common virtual pivot point. The manipulator has high positioning accuracy and is usable for example as a goniometer. By means of the supporting kinematic system, any displacement of the manipulator that results from the acceleration due to gravity, in particular in its active portion, is prevented or at least reduced further.

BRIEF DESCRIPTION OF THE DRAWINGS

Further advantages and aspects of the invention can be gathered from the claims and from the following description of preferred exemplary embodiments of the invention, which are explained in the following text with reference to the figures, in which, schematically:

DETAILED DESCRIPTION OF THE EXEMPLARY EMBODIMENTS

Figure 1:
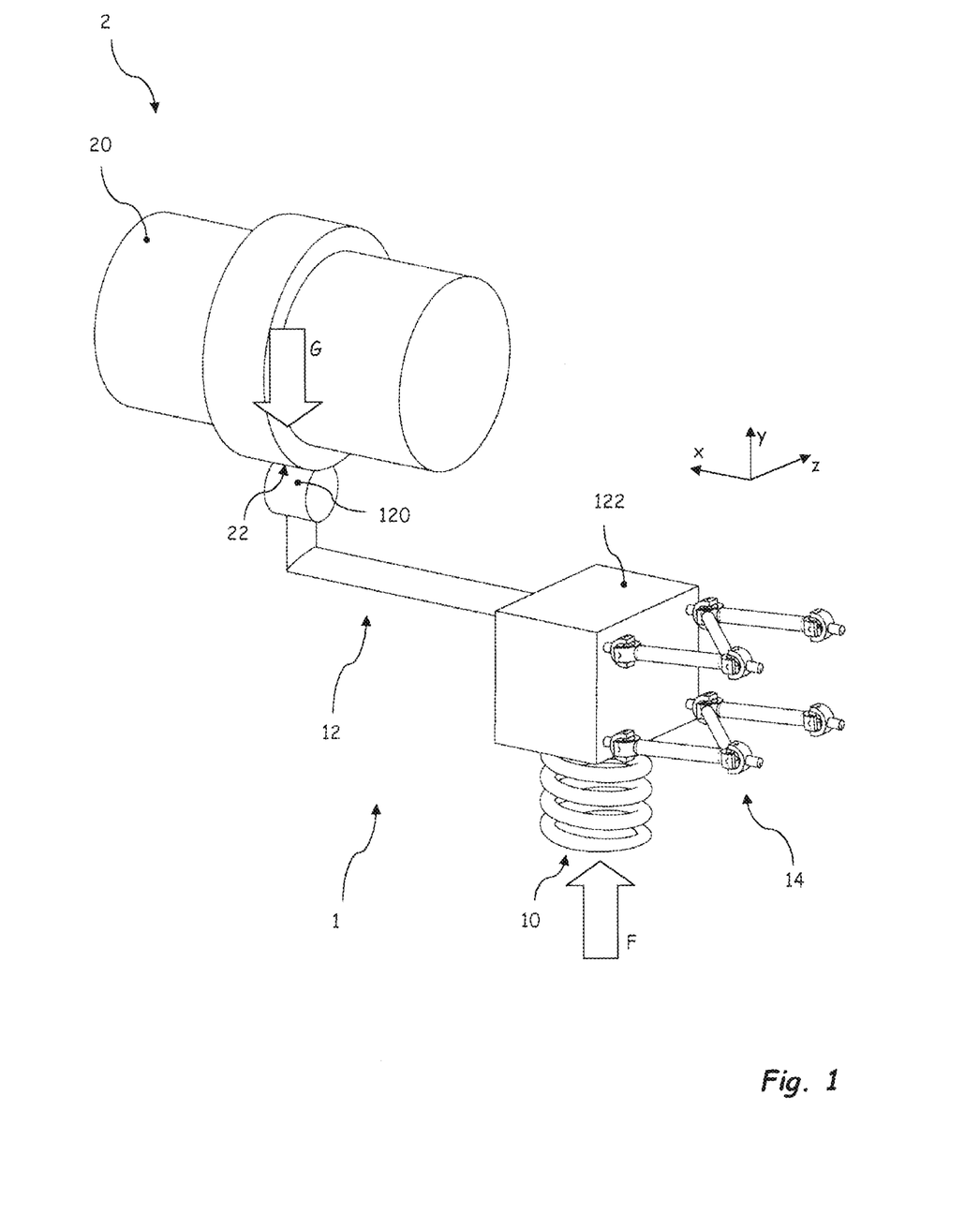
FIG. 1 shows a device for compensating the weight acting on a manipulator according to a first exemplary embodiment.

FIG. 1 shows a first exemplary embodiment of a device 1 for compensating the weight acting on a manipulator 2, wherein only one link 20 of the manipulator is illustrated. In this case, the weight G acts on the link 20.

The device 1 comprises a force generating arrangement 10, by means of which a variable counterforce F is able to be generated. The force generating arrangement 10 illustrated is in the form of a spring arrangement. The device 1 further comprises a supporting kinematic system 12, wherein the counterforce F generated is able to be applied to the manipulator 2 at the link 20 by means of the supporting kinematic system 12 in a force application region 22. A value of the counterforce F corresponds at least substantially to a value of the weight G acting on the force application region on account of the acceleration due to gravity, but the counterforce F is directed in the opposite direction to the acceleration due to gravity. A force application region 22 is in this case selected such that the counterforce F applied passes through the center of gravity of the link 20 or the relevant masses of the manipulator 2 in the current position thereof, so that no moments are introduced. If a force application region 22 is not able to be selected such that the counterforce acting on the manipulator 2 passes through the center of gravity, in an alternative configuration, moment-free support by means of a supporting kinematic system is provided, said supporting kinematic system contacting the manipulator 2 in force application regions. The two supporting kinematic system 12 has a support portion 120 by way of which it contacts the manipulator in a force application region 22. In the exemplary embodiment illustrated, a cylindrical support portion 120 is provided. A spherical support portion 120 is preferably provided for punctiform contact.

Figures 2, 3:
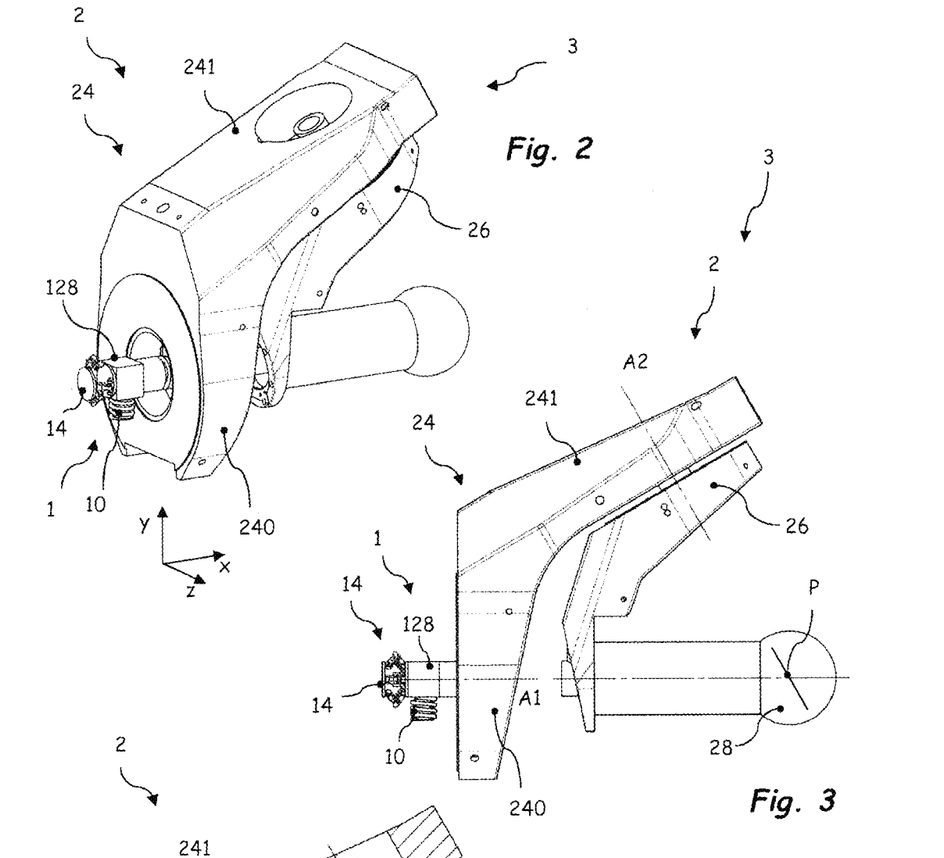
FIG. 2 shows a perspective illustration of a system comprising a device and a manipulator according to a second exemplary embodiment.
FIG. 3 shows a side view of the system according to FIG. 2.
Figure 4:
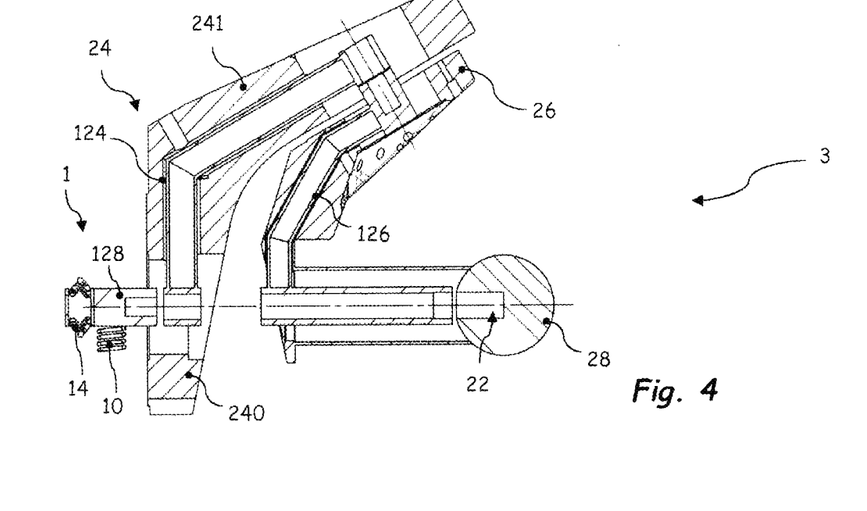
FIG. 4 shows a sectional side view of the system according to FIG. 2.
Figure 5:
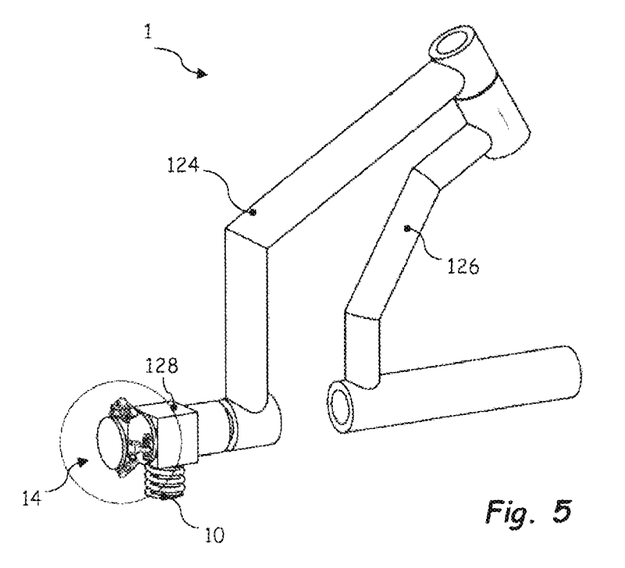
FIG. 5 shows a perspective illustration of the device for the system according to FIG. 2.
Figure 6:
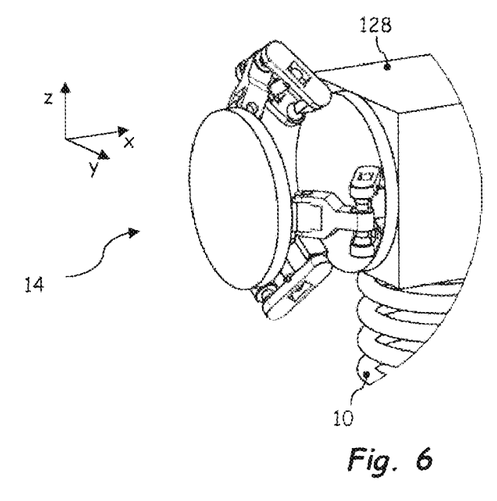
FIG. 6 shows a detail VI according to FIG. 5.

The supporting kinematic system 12 comprises a base 122 on which the force generating arrangement is arranged. The base 122 is mounted by means of a bearing arrangement 14 such that all three rotational degrees of freedom are blocked. In addition, the translational degrees of freedom in the plane perpendicular to the acceleration due to gravity (z and x directions in the illustration) are blocked. By contrast, a movement parallel to the acceleration due to gravity (y direction in the illustration) is possible for force introduction. FIGS. 2 to 4 show a perspective illustration, a side view and a sectional side view, respectively, of a system 3 comprising a device 1 and a manipulator 2 according to a second exemplary embodiment. FIG. 5 shows the device 1 for the system 3 and FIG. 6 shows a detail VI according to FIG. 5.

The manipulator 2 illustrated in FIGS. 2 to 4 comprises two links 24, 26 which are pivotable about two axes A1, A2 that are arranged at an angle of about 60° to one another and intersect one another at a common virtual pivot point P (cf. FIG. 3). In other configurations, the axes are arranged at a different angle to one another. The first link 24 is L-shaped with two legs 240, 241. The first leg 240 is coupled to a foundation (not illustrated), such that the links 24 is pivotable about a horizontal axis A1 (x axis in FIG. 2). The second link 26 is arranged on the second leg 241 and is pivotable about the axis A2. In this case, the manipulator 2 is configured such that pivoting through in each case 360° about the axes A1 and A2 is possible. The second link 26 is designed in a V-shaped manner. A load 28 to be positioned is arranged on the second link 26. The load 28 is arranged at the virtual pivot point P and changes its orientation in space, but not its position, when the manipulator 2 moves.

Depending on the application, very high positioning accuracies are required. Thus, applications are known in which a maximum deviation of the position for a picked-up load of 5 kg is 50 μm. On account of a mass of the links 24, 26 and of the load 28, deformations and thus positioning inaccuracies can arise.

According to the invention, a device 1 having a force generating arrangement 10 and a supporting kinematic system 12, which applies a counterforce to the manipulator 2, is provided. The supporting kinematic system 12 illustrated is constructed in a manner corresponding to the manipulator 2 and likewise comprises two links 124, 126. The supporting kinematic system 12 is arranged in the manipulator 2 and is moved therewith. The second link 126 is coupled at its free end to the load 28 by means of a support portion (not illustrated), such that the counterforce is applied to the load 28 at the virtual pivot point P in a force application region 22. All three translational degrees of freedom are bound at the support portion arranged at the virtual pivot point P.

As can be seen best from FIG. 5, the supporting kinematic system 12 also comprises, in addition to the two links 124, 126, a base 128. The force generating arrangement 10 is arranged on the base 128. The supporting kinematic system 12 transmits the counterforce to the support portion. The base 128 is supported on the foundation (not illustrated) of the manipulator 2 by means of a bearing arrangement 14. Also preferably provided on the supporting kinematic system 12 are entrainers (not illustrated) or the like, such that the movement of the manipulator is transmissible to the supporting kinematic system. The joints of the supporting kinematic system 12 are preferably low friction, such that only small frictional forces oppose the movement.

The bearing arrangement 14 is illustrated in detail in FIG. 6. The bearing arrangement 14 illustrated is in the form of what is known as a delta kinematic system. The designation delta kinematic system is given to a parallel kinematic system comprising a working body and a basic body, wherein the working body is movable in all three translational degrees of freedom relative to the basic body, while all three rotational degrees of freedom are blocked. Consequently, on account of the bearing arrangement 14, movements of the base 128 in all three rotational degrees of freedom are blocked. The base 128 is able to move in the z and x directions in order to avoid tensions. The movement in the y direction serves for force introduction.

Figure 7:
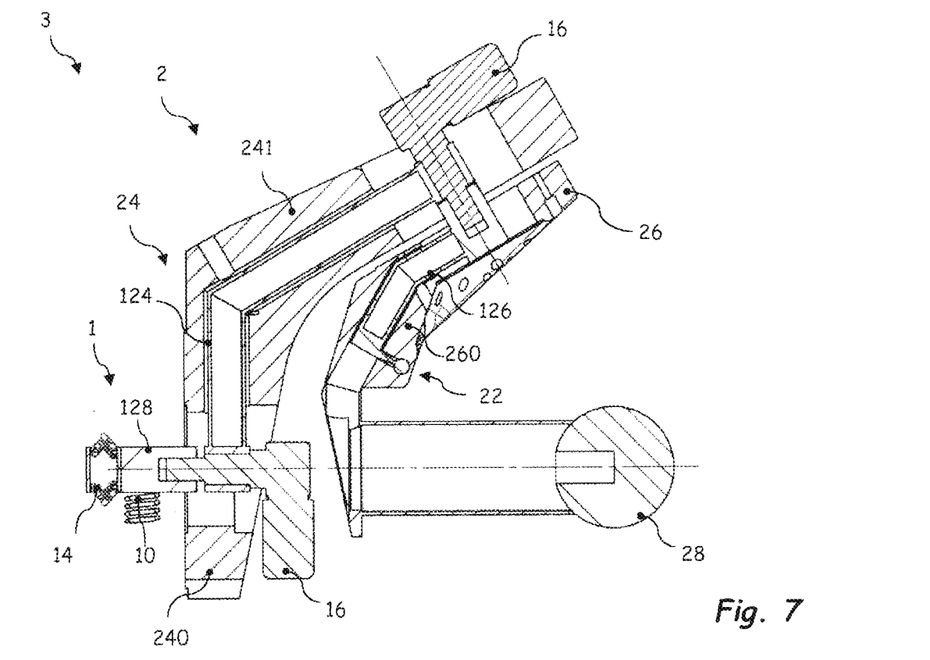
FIG. 7 shows a sectional side view similar to FIG. 4 of a system comprising a device and a manipulator according to a third exemplary embodiment.
Figure 8:
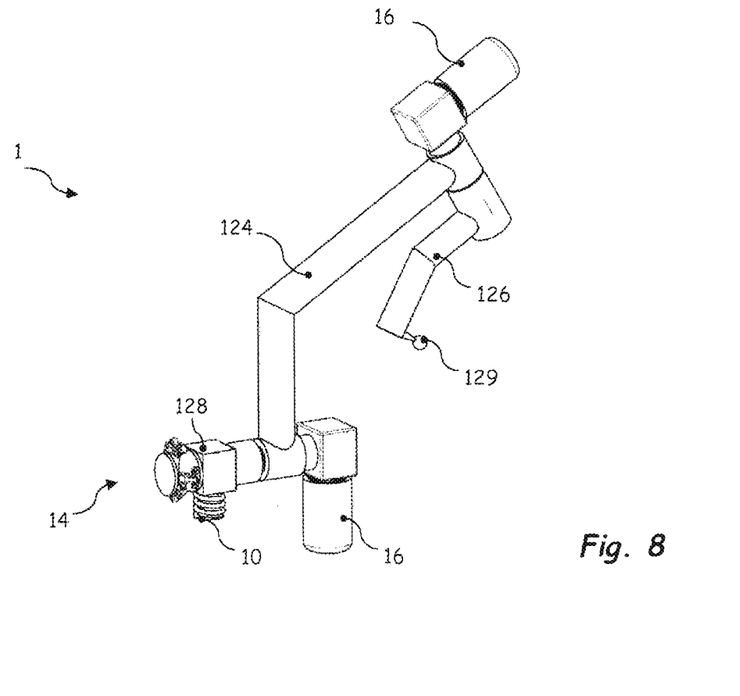
FIG. 8 shows a perspective illustration of the device for the system according to FIG. 7.

FIG. 7 shows a sectional side view similar to FIG. 4 of a system 3 comprising a device 1 and a manipulator 2 according to a third exemplary embodiment. FIG. 8 shows a perspective illustration of the device 1 for the system 3 according to FIG. 7. The system 3 is similar to the system 3 according to FIGS. 2 to 6 and the same reference signs are used for identical or similar components.

The manipulator 2 is of identical structure to the manipulator according to FIGS. 2 to 4. However, the device 1 is configured such that the counterforce is not applied in the region of the virtual pivot point but to a leg 260 of the second link 26.

The supporting kinematic system 12 comprises a support portion 129, by means of which it contacts the second leg 260 in the force application region 22. The support portion 129 is in the form of a ball joint.

In order to bind all three translational degrees of freedom at the support portion 129, which is arranged at a suitably selected point depending on space requirements or the like, a respective drive 16 is provided at the two joints, said drives 16 acting as brakes and applying moments which counteract any displacement of the support portion 129. However, the drives 16 do not serve to position the links 24, 26 of the manipulator 2.

Figure 9:
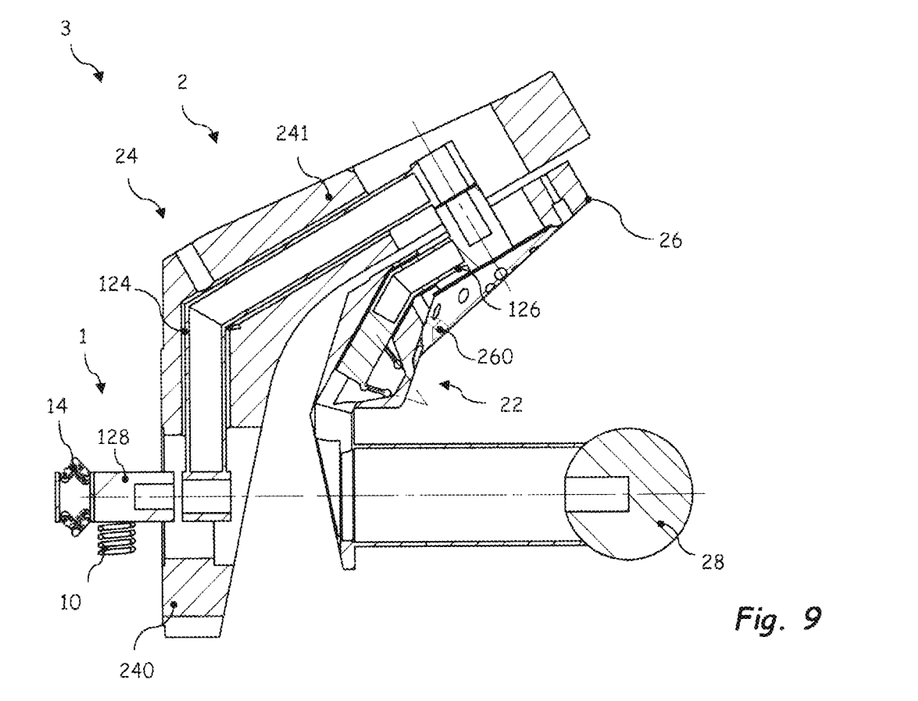
FIG. 9 shows a sectional side view similar to FIG. 4 of a system comprising a device and a manipulator according to a fourth exemplary embodiment.
Figure 10:
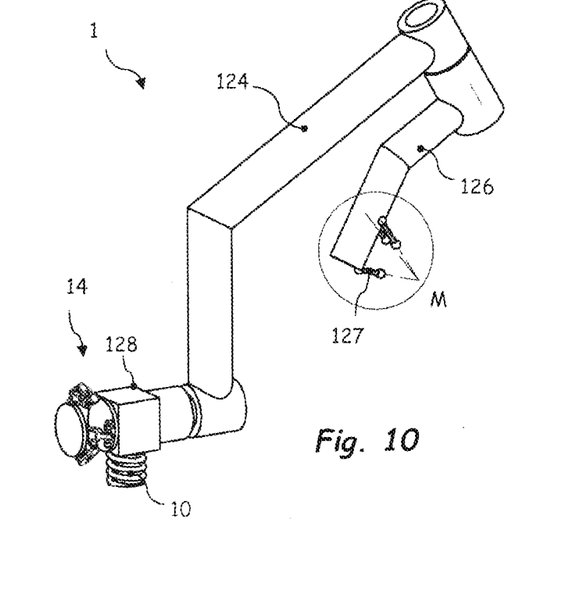
FIG. 10 shows a perspective illustration of the device for the system according to FIG. 9.
Figure 11:
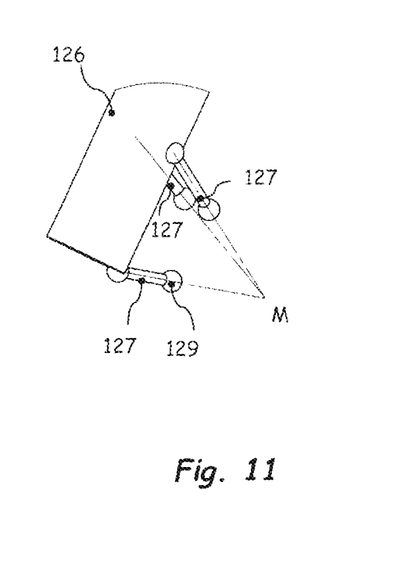
FIG. 11 shows a detail XI according to FIG. 10.

In FIGS. 7 and 8, an actual ball joint is provided as support portion 129. However, configurations are also conceivable in which the actual ball joint is replaced by a virtual ball joint. FIG. 9 shows a sectional side view similar to FIG. 4 of a system 3 comprising a device 1 and a manipulator 2 according to a fourth exemplary embodiment. FIG. 10 shows a perspective illustration of the device 1 for the system 3 according to FIG. 9 and FIG. 11 shows a detail XI according to FIG. 10. The system 3 is similar to the system 3 according to FIGS. 2 to 6 and the same reference signs are used for identical or similar components. In particular, the manipulator 2 is of identical structure to the manipulator according to FIGS. 2 to 4.

In contrast to the preceding configurations, force transmission takes place at a virtual ball joint, the center of which forms an instantaneous center of rotation M for the application of force to the manipulator 2. The virtual ball joint comprises three rods 127, wherein axes of the rods 127 intersect at the instantaneous center of rotation M. In advantageous configurations, the position of the instantaneous center of rotation M is selected such that the position corresponds to the center of gravity of the manipulator 2. In order to take changes in the position of the center of gravity into consideration in the event of the manipulator 2 moving, the rods 127 are arranged on the link 126 of the supporting kinematic system 12 by means of ball joints in the exemplary embodiment illustrated. In other configurations, the rods 127 are connected integrally or monolithically to a link, wherein—depending on the design of the manipulator 2 and of the supporting kinematic system—the deviations between the position of the instantaneous center of rotation M and the position of the center of gravity are negligibly small. The free ends of the rods 127 contact the manipulator 2 and serve as actual support portions 129. In order to bind all three translational degrees of freedom at the instantaneous center of rotation M in a similar manner to FIGS. 7 and 8, in one configuration, a respective drive 16 is provided at the two joints, said drives 16 acting as brakes and applying moments which counteract any displacement of the instantaneous center of rotation M.

The invention claimed is:

1. A method for compensating the weight acting on a manipulator, the method comprising:
   generating a variable counterforce;
   applying the counterforce generated to the manipulator by means of a supporting kinematic system that contacts the manipulator in at least one force application region, wherein said supporting kinematic system is configured in a manner corresponding to a kinematic system of the manipulator and is arranged in the kinematic system of the manipulator, and
   directing the counterforce parallel and in the opposite direction to the acceleration due to gravity;
   wherein a value of the counterforce corresponds to a value of the weight acting on the force application region on account of acceleration due to gravity.

2. A device for compensating the weight acting on a manipulator, comprising:
   a force generating arrangement by means of which a variable counterforce can be generated, and
   a supporting kinematic system, wherein the counterforce generated can be applied to the manipulator via the supporting kinematic system in at least one force application region, and
   wherein the supporting kinematic system is configured in a manner corresponding to a kinematic system of the manipulator and is arranged in the kinematic system of the manipulator, and
   wherein a value of the counterforce corresponds to a value of the weight acting on the force application region on account of acceleration due to gravity, and the counterforce is directed parallel and in the opposite direction to the acceleration due to gravity.

3. The device as claimed in claim 2, wherein the supporting kinematic system has at least one support portion by means of which the supporting kinematic system contacts the manipulator in the at least one force application region.

4. The device as claimed in claim 3, wherein all three translational degrees of freedom are bound at the support portion.

5. The device as claimed in claim 3, wherein the supporting kinematic system comprises a base and at least two links, wherein the force generating arrangement is arranged on the base and the supporting kinematic system transmits the counterforce to the at least one support portion.

6. The device as claimed in claim 5, wherein the links are arranged so as to be pivotable about a common, virtual pivot point, wherein the support portion is located at the virtual pivot point.

7. The device as claimed in claim 5, wherein at least one joint of the supporting kinematic system is assigned an additional drive.

8. The device as claimed in claim 5, wherein all three rotational degrees of freedom are bound at the base.

9. The device as claimed in claim 2, wherein the supporting kinematic system comprises entraining elements for coupling to the manipulator.

10. A system comprising a manipulator and a device as claimed in claim 2.

11. The system as claimed in claim 10, wherein the manipulator comprises two links which are pivotable about two axes that are arranged at an angle of about 0° to about 90° to one another and intersect one another at a common virtual pivot point.

12. The system as claimed in claim 11, wherein the two axes are arranged at an angle of about 5° to about 90° to one another.

\* \* \* \* \*